United States Patent
Gopalan et al.

(10) Patent No.: US 10,388,298 B1
(45) Date of Patent: Aug. 20, 2019

(54) METHODS FOR DETECTING DOUBLE TALK

(71) Applicant: Amazon Technologies, Inc., Seattle, WA (US)

(72) Inventors: Ramya Gopalan, Santa Clara, CA (US); Carlo Murgia, Santa Clara, CA (US); Sridhar Pilli, Fremont, CA (US)

(73) Assignee: Amazon Technologies, inc., Seattle, WA (US)

( * ) Notice: Subject to any disclaimer, the term of this patent is extended or adjusted under 35 U.S.C. 154(b) by 0 days.

(21) Appl. No.: 15/585,486

(22) Filed: May 3, 2017

(51) Int. Cl.
| | |
|---|---|
| *G10L 21/0208* | (2013.01) |
| *H04M 9/08* | (2006.01) |
| *G10L 21/0232* | (2013.01) |
| *H04B 3/23* | (2006.01) |
| *H04B 3/466* | (2015.01) |
| *G10L 21/00* | (2013.01) |
| *H04B 3/20* | (2006.01) |

(52) U.S. Cl.
CPC ...... *G10L 21/0232* (2013.01); *G10L 21/0208* (2013.01); *H04B 3/234* (2013.01); *H04B 3/466* (2013.01); *H04M 9/082* (2013.01); *G10L 21/00* (2013.01); *G10L 2021/02082* (2013.01); *H04B 3/20* (2013.01)

(58) Field of Classification Search
CPC ......... H04M 9/082; G10L 2021/02082; G10L 21/0208
See application file for complete search history.

(56) References Cited

U.S. PATENT DOCUMENTS

| | | | | |
|---|---|---|---|---|
| 2003/0117967 | A1* | 6/2003 | Tahernezhaadi | H04B 3/23 370/286 |
| 2004/0218755 | A1* | 11/2004 | Marton | H04M 9/082 379/406.14 |
| 2005/0129225 | A1* | 6/2005 | Piket | H04M 9/082 379/406.01 |
| 2006/0098807 | A1* | 5/2006 | Page | H04M 9/082 379/406.01 |
| 2008/0159551 | A1* | 7/2008 | Harley | H04M 9/082 381/66 |
| 2008/0298601 | A1* | 12/2008 | Rahbar | H04M 9/082 381/66 |
| 2010/0183140 | A1* | 7/2010 | Cheng | H04M 9/082 379/406.03 |

(Continued)

*Primary Examiner* — Bryan S Blankenagel
(74) *Attorney, Agent, or Firm* — Pierce Atwood LLP

(57) ABSTRACT

A system configured to improve speech quality by performing residual echo suppression (RES). The system may detect when double talk is present in a voice conversation and may use different attenuation parameters based on a frequency of audio data. The system may perform RES on the audio data using a low attenuation value for low frequencies and a high attenuation value for high frequencies and determine that double talk is present when a difference in energy level between the low frequencies and the high frequencies is below a threshold. If double talk is present, the RES may generate output audio data using a low attenuation value for low frequencies and a high attenuation value for high frequencies. If double talk is not present, the RES may generate output audio data using a high attenuation value for low frequencies and a high attenuation value for high frequencies.

23 Claims, 8 Drawing Sheets

(56) References Cited

U.S. PATENT DOCUMENTS

| | | | |
|---|---|---|---|
| 2010/0223054 A1* | 9/2010 | Nemer | H04R 3/007 704/219 |
| 2010/0296668 A1* | 11/2010 | Lee | G10K 11/1784 381/94.7 |
| 2011/0033059 A1* | 2/2011 | Bhaskar | H04M 9/082 381/71.4 |
| 2014/0140555 A1* | 5/2014 | Pilgrim | H04R 25/453 381/317 |
| 2014/0278381 A1* | 9/2014 | Dehghani | H04M 9/082 704/206 |
| 2014/0334620 A1* | 11/2014 | Yemdji | G10L 21/0232 379/406.08 |
| 2015/0350777 A1* | 12/2015 | Yang | H04M 9/08 381/66 |
| 2016/0155453 A1* | 6/2016 | Harvey | H04R 3/005 381/26 |
| 2018/0309871 A1* | 10/2018 | Shi | H04B 3/23 |

* cited by examiner

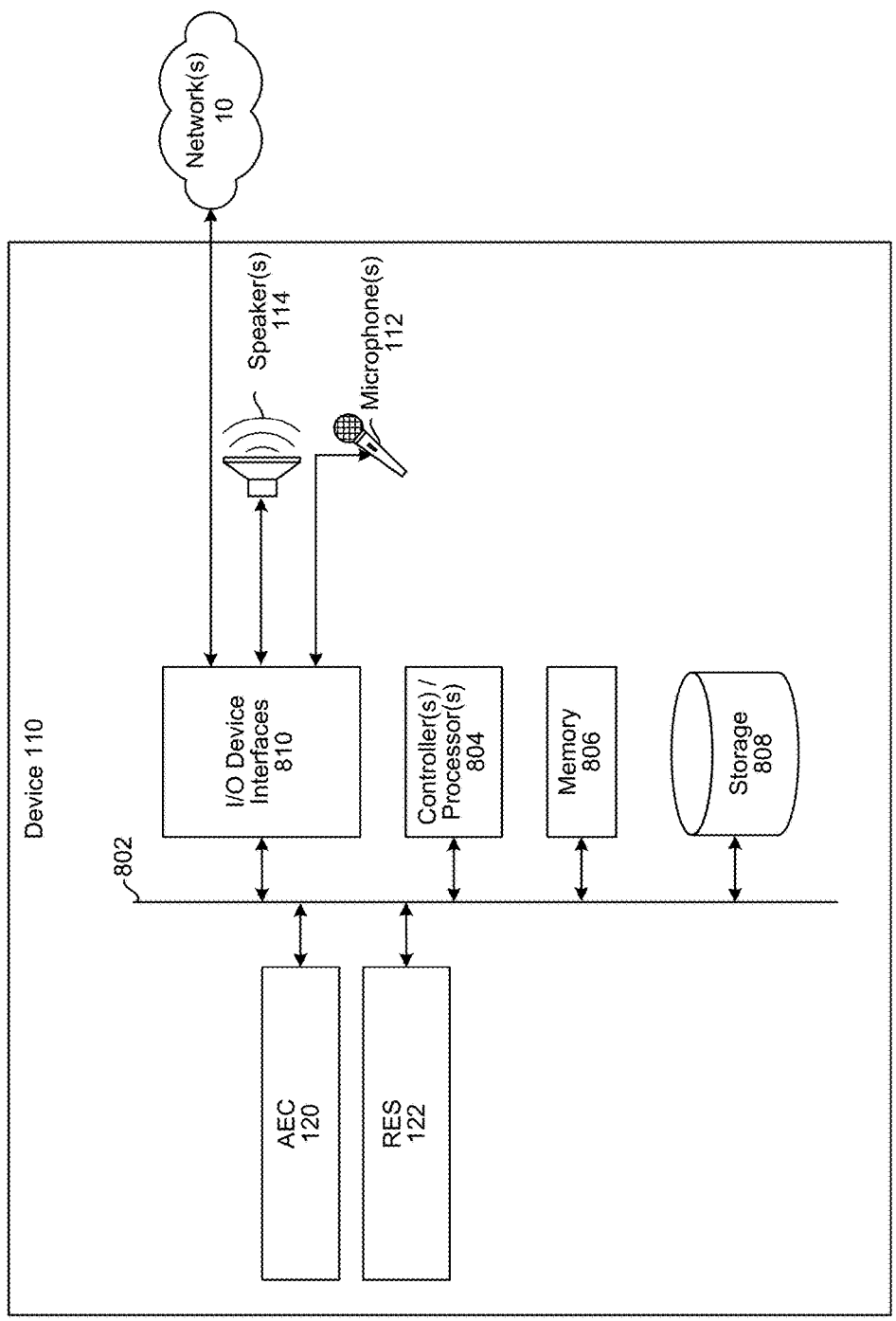

METHODS FOR DETECTING DOUBLE TALK

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 8 is a block diagram conceptually illustrating example components of a system according to embodiments of the present disclosure.

DETAILED DESCRIPTION

Electronic devices may be used to capture and process audio data. The audio data may be used for voice commands and/or may be output by speakers as part of a communication session. During a communication session, speakers may generate audio using remote audio data while a microphone generates local audio data. An electronic device may perform acoustic echo cancellation to remove an "echo" signal corresponding to the remote audio data from the local audio data, isolating local speech to be used for voice commands and/or the communication session. As the acoustic echo cancellation may not remove the entire echo signal, the device may also perform residual echo suppression to suppress unwanted additional signals. When remote speech is present in the remote audio data and local speech is not present in the local audio data (e.g., "far end single talk)", the device may use a high attenuation value to suppress the unwanted additional signals included in the local audio data. When local speech is present in the local audio data but remote speech is not present in the remote audio data (e.g., "near end single talk"), the device may use a low attenuation value to pass any speech included in the local audio data. However, when remote speech is present in the remote audio data and local speech is present in the local audio data (e.g., "double talk"), a high attenuation value suppresses the local speech while a low attenuation value passes unwanted additional signals.

To improve residual echo suppression, devices, systems and methods are disclosed that detect when double talk is present in a voice conversation and apply appropriate attenuation values and/or gain values based on system conditions. For example, the system may perform residual echo suppression on audio data using a low attenuation value for low frequencies and a high attenuation value for high frequencies and determine that double talk is present when a difference in energy level between the low frequencies and the high frequencies is below a threshold. When double talk is present, the system may use different attenuation parameters based on a frequency of audio data. For example, if double talk is present, the system may generate output audio data using a low attenuation value for low frequencies and a high attenuation value for high frequencies. If double talk is not present (e.g., far end single talk is present), the system may generate output audio data using a high attenuation value for low frequencies and a high attenuation value for high frequencies.

Figure 1:
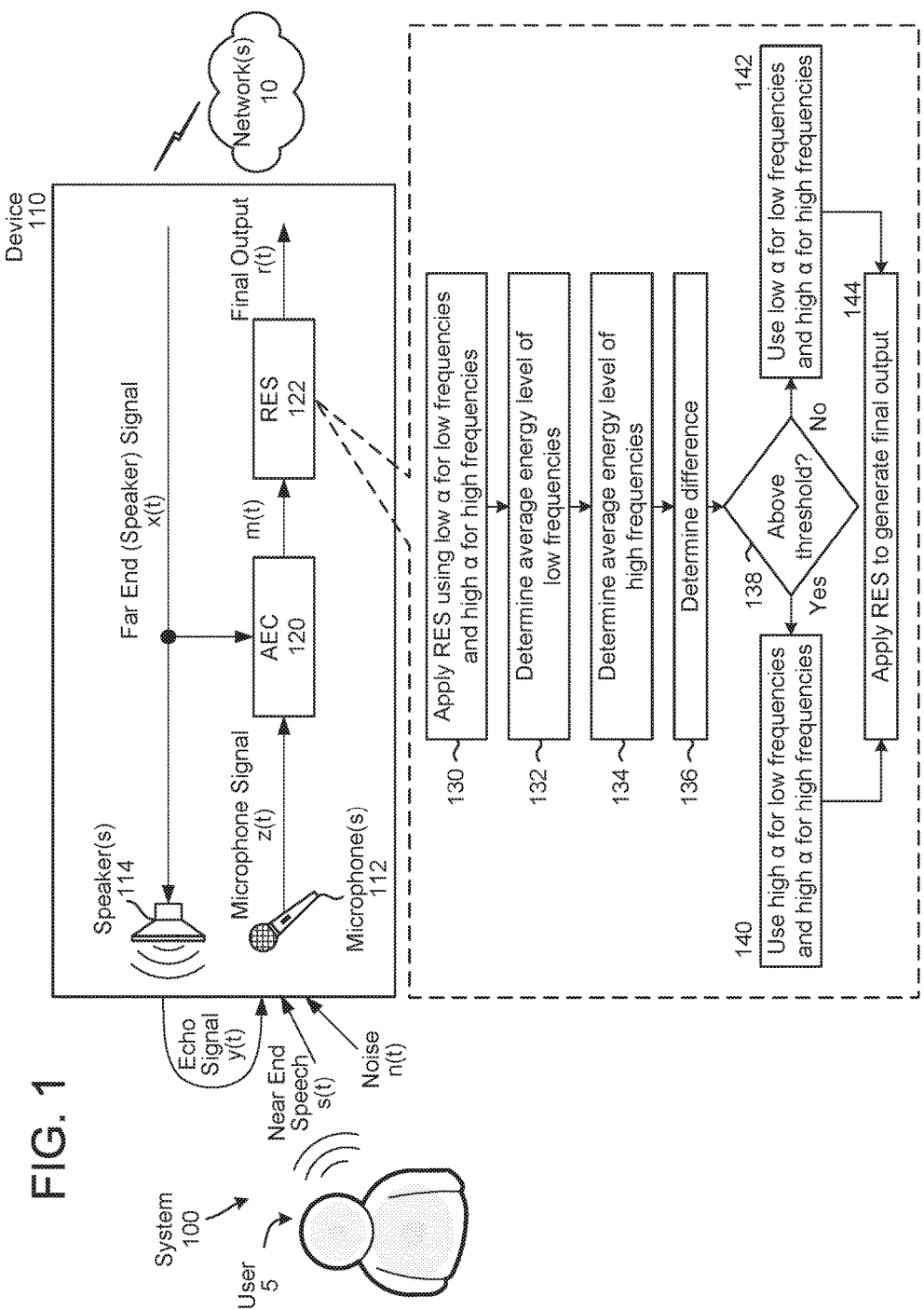
FIG. 1 illustrates a system according to embodiments of the present disclosure.

FIG. 1 illustrates a high-level conceptual block diagram of a system 100 configured to perform residual echo suppression. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 10.

An audio signal is a representation of sound and an electronic representation of an audio signal may be referred to as audio data, which may be analog and/or digital without departing from the disclosure. For ease of illustration, the disclosure may refer to either audio signals (e.g., a far end signal x(t), an echo signal y(t), an echo estimate signal y'(t), a microphone signal z(t), error signal m(t), etc.) or audio data (e.g., far end audio data x(t), echo audio data y(t), echo estimate data y'(t), microphone audio data z(t), error audio data m(t), etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure.

The device 110 may be an electronic device configured to send audio data to and/or receive audio data. The device 110 may include one or more microphone(s) 112 and/or one or more speaker(s) 114, although the disclosure is not limited thereto and the device 110 may include additional components without departing from the disclosure. During a communication session, the device 110 may receive remote audio data (e.g., playback audio data) from a remote device/remote server(s) via the network(s) 10 and may generate output audio (e.g., playback audio) based on the remote audio data using the speaker(s) 114. Using the microphone(s) 112, the device 110 may capture input audio as input audio data and may send the input audio data to the remote device/remote server(s) via the network(s) 10.

In some examples, the device 110 may send the input audio data to the remote device as part of a Voice over Internet Protocol (VoIP) communication session. For example, the device 110 may send the input audio data to the remote device either directly or via remote server(s) and may receive the remote audio data from the remote device either directly or via the remote server(s). However, the disclosure is not limited thereto and in some examples, the device 110 may send the input audio data to the remote server(s) in order for the remote server(s) to determine a voice command. For example, during a communication session the device 110 may receive the remote audio data from the remote device and may generate the output audio based on the remote audio data. However, the input audio data may be separate from the communication session and may include a voice command directed to the remote server(s). Therefore, the device 110 may send the input audio data to the remote server(s) and the remote server(s) may determine a voice command represented in the input audio data and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like.

Prior to sending the input audio data to the remote device/remote server(s), the device 110 may perform acoustic echo cancellation (AEC) and/or residual echo suppression (RES) to isolate local speech captured by the microphone(s) 112 and/or to suppress unwanted audio data (e.g., echoes and/or noise). For example, the device 110 may receive the remote audio data (e.g., far end (speaker) signal x(t)) and may generate playback audio (e.g., echo signal y(t)) using the speaker(s) 114. The far end signal x(t) may be referred to as a playback signal (e.g., playback audio data) or the like and may correspond to incoming audio data received during a communication session. The microphone(s) 112 may capture input audio (e.g., microphone signal z(t)), which may include the echo signal y(t) along with near end speech s(t) from the user 5 and noise n(t). To isolate the local speech (e.g., near end speech s(t) from the user 5), the device 110 may include an Acoustic Echo Canceller (AEC) 120 that generates an echo estimate signal y'(t) based on the far end signal x(t) and removes the echo estimate signal y'(t) from the microphone signal z(t). As the AEC 120 does not have access to the echo signal y(t), the echo estimate signal y'(t) is an attempt to model the echo signal y(t) based on the far end signal x(t). Thus, when the AEC 120 removes the echo estimate signal y'(t) from the microphone signal z(t), the AEC 120 is removing at least a portion of the echo signal y(t). Therefore, an output (e.g., error signal m(t)) of the AEC 120 may include the near end speech s(t), the noise n(t) and portions of the echo signal y(t) caused by differences between the echo estimate signal y'(t) and the actual echo signal y(t).

To further improve the audio data, the device 110 may include a residual echo suppressor (RES) 122 to dynamically suppress unwanted audio data (e.g., the noise n(t) and the portions of the echo signal y(t) that were not removed by the AEC 120). For example, when the far end signal x(t) is active and the near end speech s(t) is not present in the error signal m(t), the RES 122 may attenuate the error signal m(t) to generate final output audio data r(t). This removes and/or reduces the unwanted audio data from the final output audio data r(t). However, when near end speech s(t) is present in the error signal m(t), the RES 122 may act as a pass-through filter and pass the error signal m(t) without attenuation. This avoids attenuating the near end speech s(t).

Figure 2:
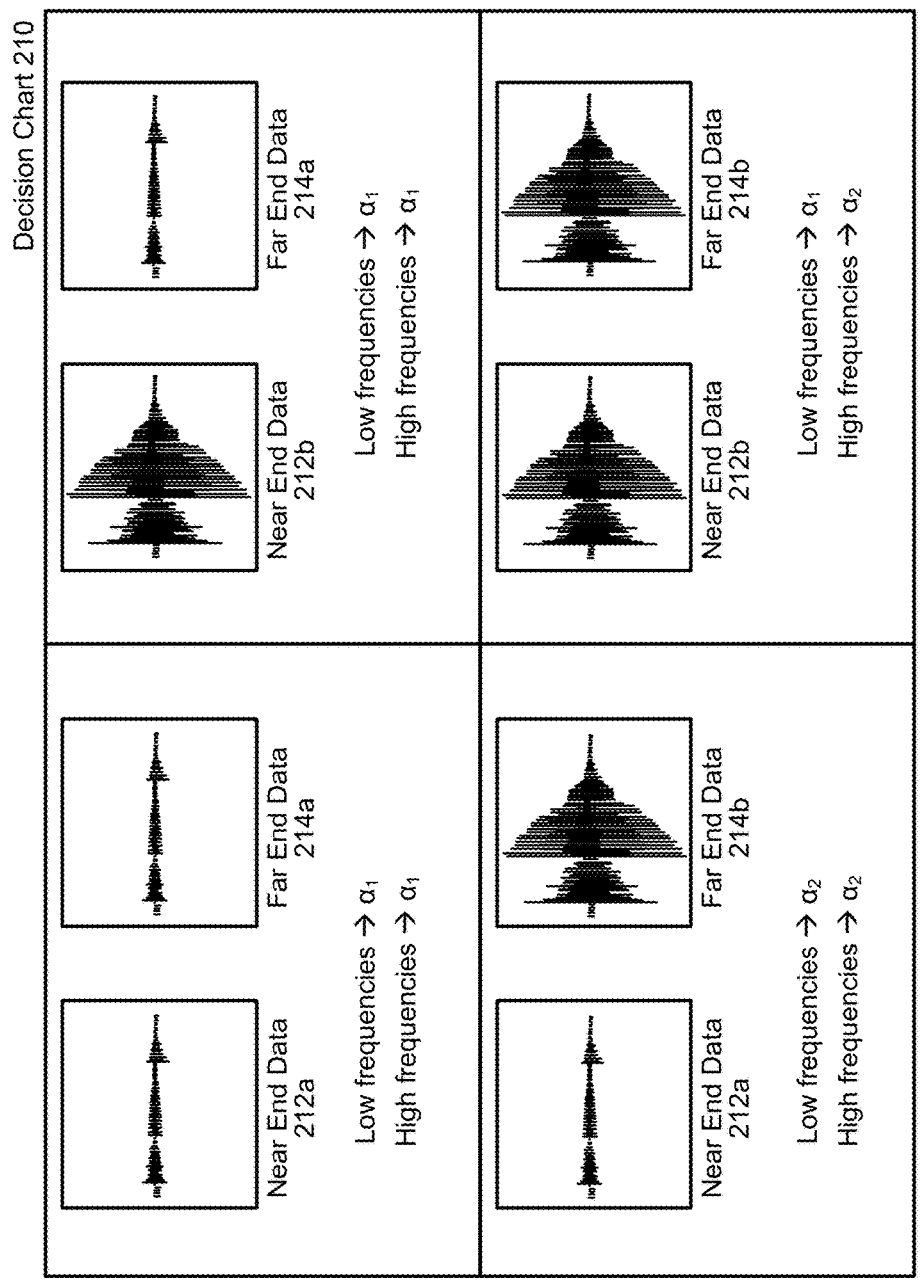
FIG. 2 illustrates an example decision chart for selecting attenuation values based on system conditions according to examples of the present disclosure.

FIG. 2 illustrates an example decision chart for selecting attenuation values based on system conditions according to examples of the present disclosure. As used herein, an attenuation value may be represented as $\alpha$. The RES 122 may operate based on a decision chart 210 illustrated in FIG. 2. For example, when the far end speech is not present (e.g., far end data 214a), the RES 122 may act as a pass through filter and pass the error signal m(t) without attenuation. That includes when the near end speech is not present (e.g., near end data 212a), which is referred to as "no talk," and when the near end speech is present (e.g., near end data 212b), which is referred to as "near end single talk." Thus, the RES 122 may determine a gain with which to attenuate the error signal m(t) using a first attenuation value ($\alpha_1$) for both low frequencies and high frequencies. In contrast, when the far end speech is present (e.g., far end data 214b) and the near end speech is not present (e.g., near end data 212a), which is referred to as "far end single talk," the RES 122 may act as an attenuator and may attenuate the error signal m(t) based on a gain calculated using a second attenuation value ($\alpha_2$) for low frequencies and high frequencies. For ease of illustration, the first attenuation value $\alpha_1$ may be referred to as a "low attenuation value" and may be smaller (e.g., closer to a value of zero) than the second attenuation value $\alpha_2$. Similarly, the second attenuation value $\alpha_2$ may be referred to as a "high attenuation value" and may be larger (e.g., closer to a value of one) than the first attenuation value $\alpha_1$. However, the disclosure is not limited thereto and in some examples the first attenuation value $\alpha_1$ may be higher than the second attenuation value $\alpha_2$ without departing from the disclosure.

When the near end speech is present (e.g., near end data 212b) and the far end speech is present (e.g., far end data 214b), "double talk" occurs. During double talk, the RES 122 may pass low frequencies of the error signal m(t) while attenuating high frequencies of the error signal m(t). For example, the RES 122 may determine a gain with which to attenuate the error signal m(t) using the low attenuation value ($\alpha_1$) for low frequencies and the high attenuation value ($\alpha_2$) for high frequencies.

As the far end speech corresponds to the far end signal x(t), the device 110 may easily determine whether the far end speech is present based on an energy level of the far end signal x(t). For example, the device 110 may determine that the far end speech is not present when the far end signal x(t) is not active (e.g., an average energy level of the far end signal x(t) is below a threshold value). Therefore, the device 110 may easily differentiate between the top row (e.g., no talk or near end single talk) and the bottom row (e.g., far end single talk or double talk) of the decision chart 210 based on the energy level of the far end signal x(t).

However, the microphone signal z(t) does not correspond to the near end speech s(t), as the microphone signal z(t) also includes the echo signal y(t) and the noise n(t). Therefore, the device 110 may not easily determine when the near end speech s(t) is present in the error signal m(t). For example, the error signal m(t) may be active (e.g., average energy level above the threshold value) due only to poor acoustic echo cancellation and/or a lot of noise. Thus, the error signal m(t) is active but the near end speech s(t) is not present.

To identify when the near end speech s(t) is present in the error signal m(t), the device 110 may use the RES 122 to attenuate the audio data using the low attenuation value ($\alpha_1$) for low frequencies and the high attenuation value ($\alpha_2$) for high frequencies and determining a difference in energy levels between the low frequencies and the high frequencies. For example, the RES 122 may determine a first energy level corresponding to the low frequencies, determine a second energy level corresponding to the high frequencies and determine a difference between the first energy level and the second energy level. When the difference is above a second threshold value, the near end speech s(t) is not present and only the echo signal y(t) and noise n(t) is present in the error signal m(t), corresponding to far end single talk. In contrast, when the difference is below the second threshold value, the near end speech s(t) is present, corresponding to near end single talk when the far end signal x(t) is inactive (e.g., below the threshold value) and to double talk when the far end signal x(t) is active (e.g., above the threshold value).

Figure 3:
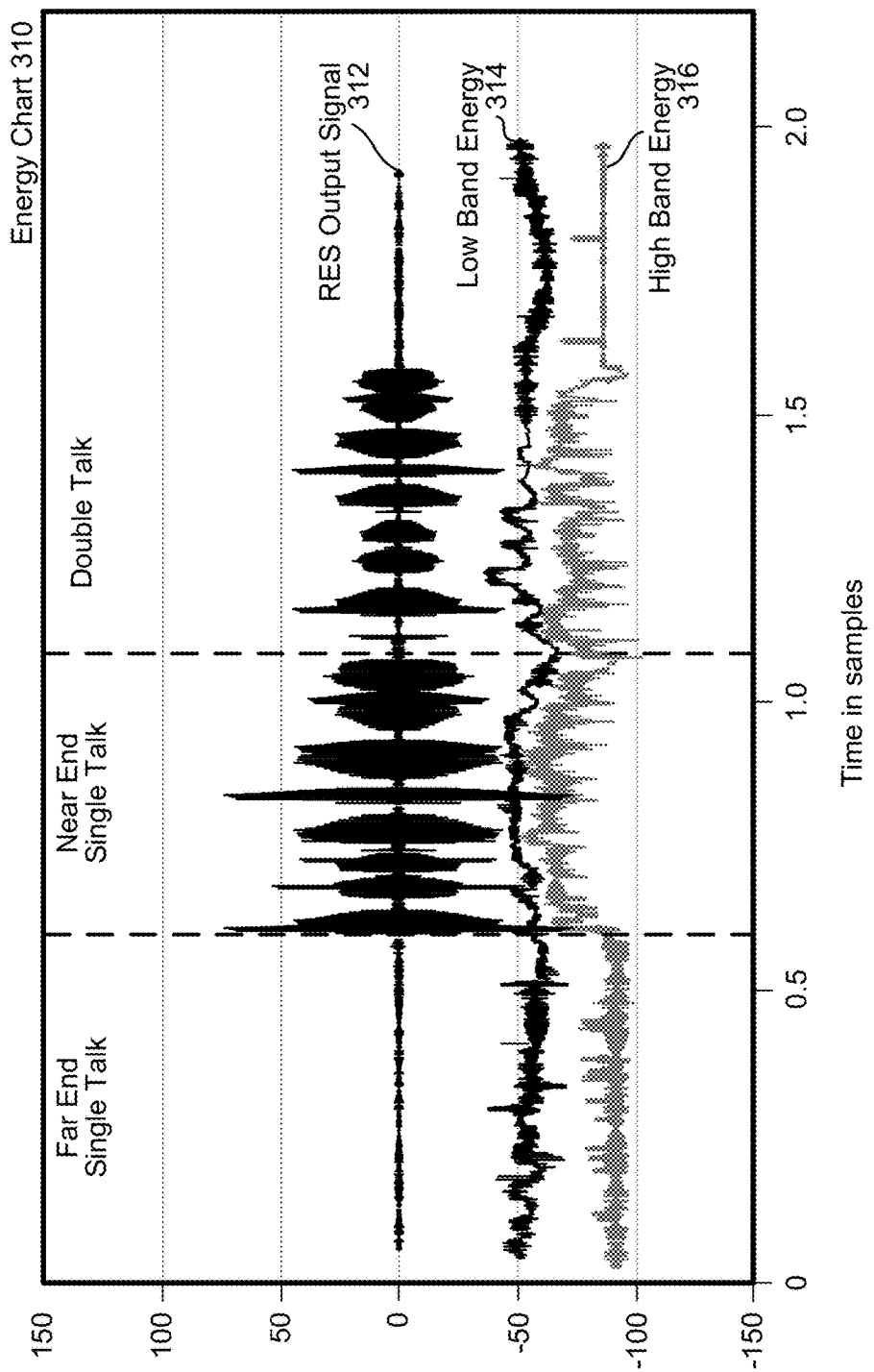
FIG. 3 illustrates examples of energy levels in different frequency bands based on system conditions according to examples of the present disclosure.

FIG. 3 illustrates examples of energy levels in different frequency bands based on system conditions according to examples of the present disclosure. The energy chart 310 illustrates examples of the differences in energy values. For example, the energy chart 310 includes a RES output signal 312, low band energy 314 (e.g., energy level corresponding to the low frequencies) and high band energy 316 (e.g., energy level corresponding to the high frequencies). During a first portion of the energy chart 310 (e.g., 0 s-0.6 s), a difference between the low band energy 314 and the high band energy 316 is above the second threshold and the device 110 may determine that the near end speech s(t) is not present, corresponding to far end single talk. Around 0.6 seconds, the high band energy 316 jumps up and the difference between the low band energy 314 and the high band energy 316 decreases below the second threshold, indicating that near end speech s(t) is present. During a second portion of the energy chart 310 (e.g., 0.6 s-1.1 s), the device 110 may determine that the far end signal x(t) is not active, which corresponds to near end single talk. During a third portion of the energy chart 310 (e.g., 1.1 s-1.6 s), the device 110 may determine that the far end signal x(t) is active, which corresponds to double talk. During a fourth portion of the energy chart 310 (e.g., 1.6 s-2 s), neither the near end speech s(t) or the far end signal x(t) are present, which corresponds to no talk.

Figure 5:
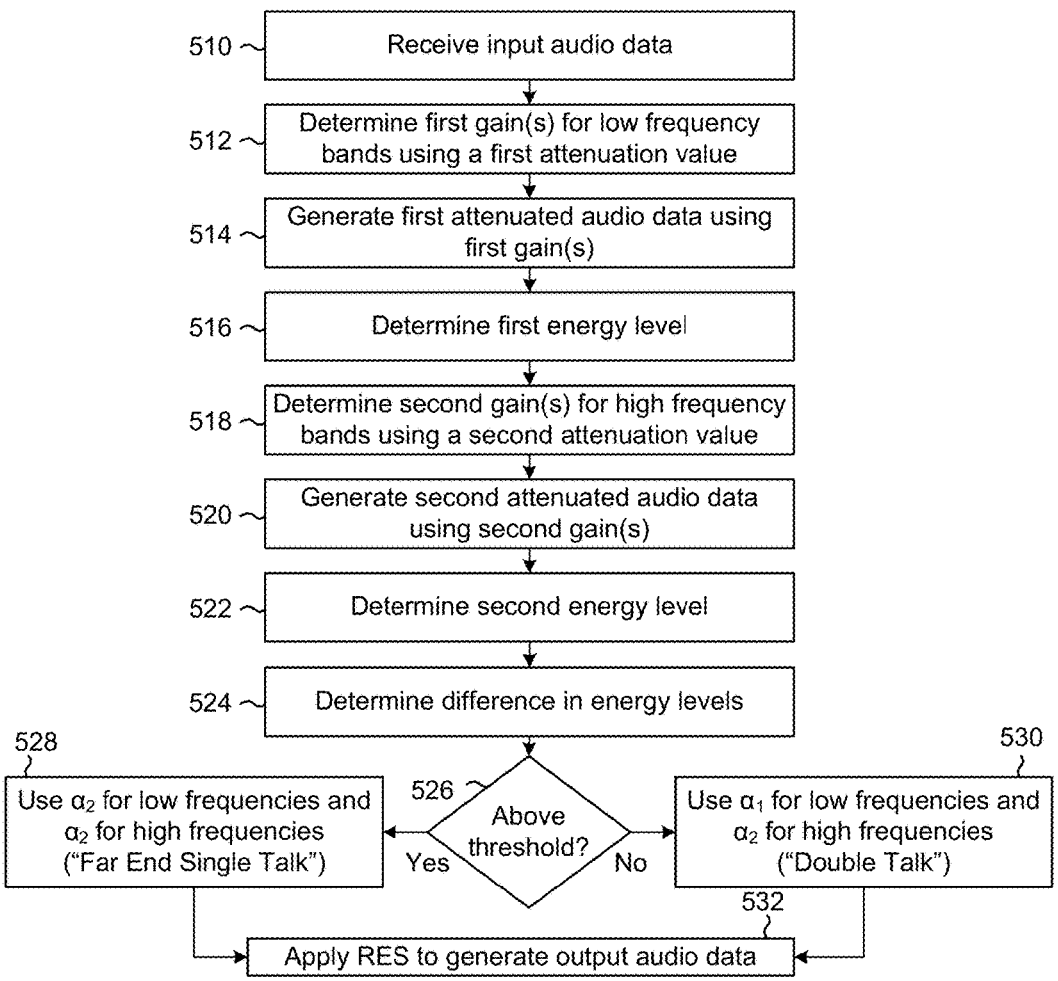
FIG. 5 is a flowchart conceptually illustrating an example method for detecting double talk according to examples of the present disclosure.
Figure 6:
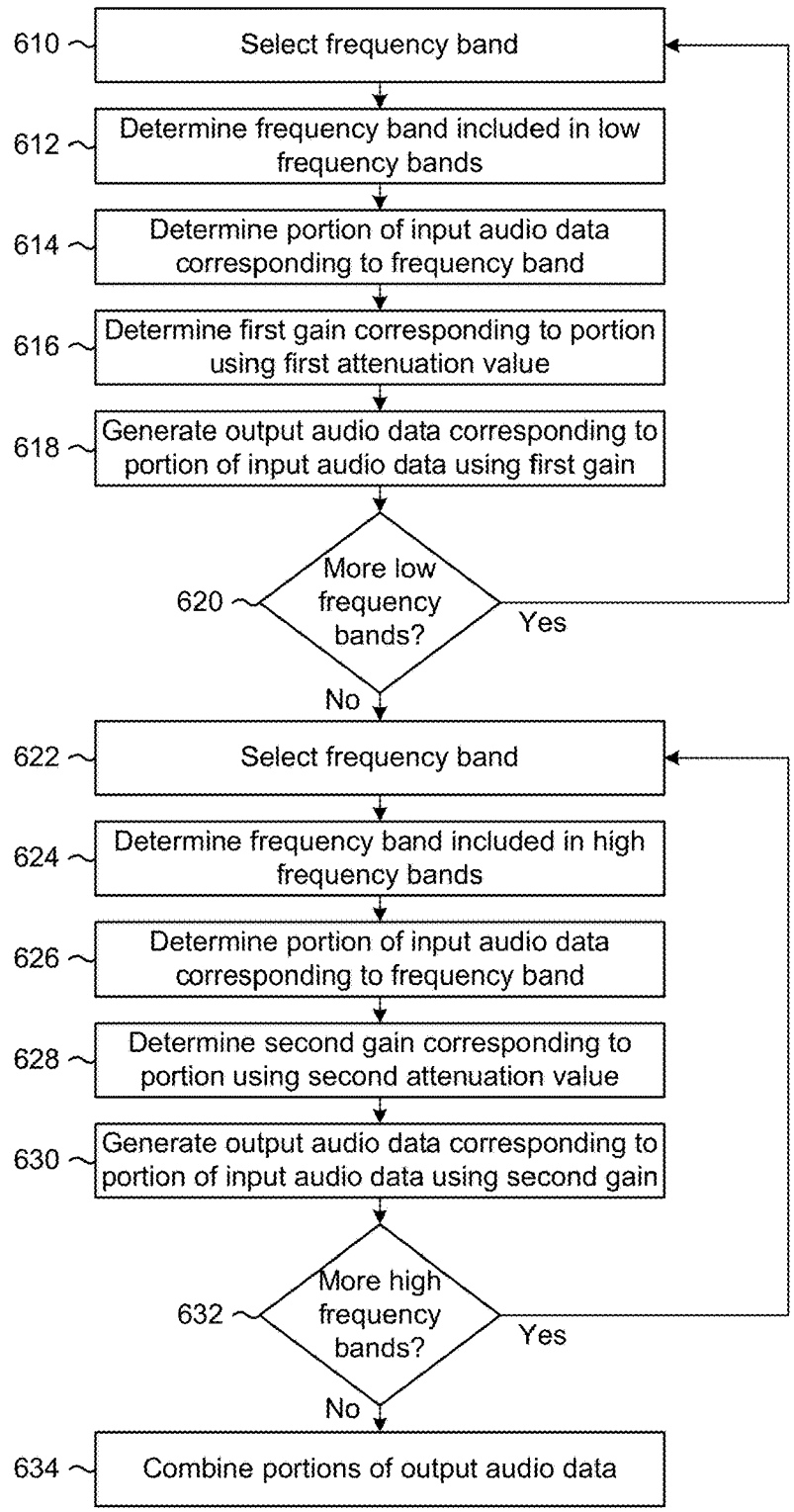
FIG. 6 is a flowchart conceptually illustrating an example method for performing residual echo suppression according to examples of the present disclosure.
Figure 7:
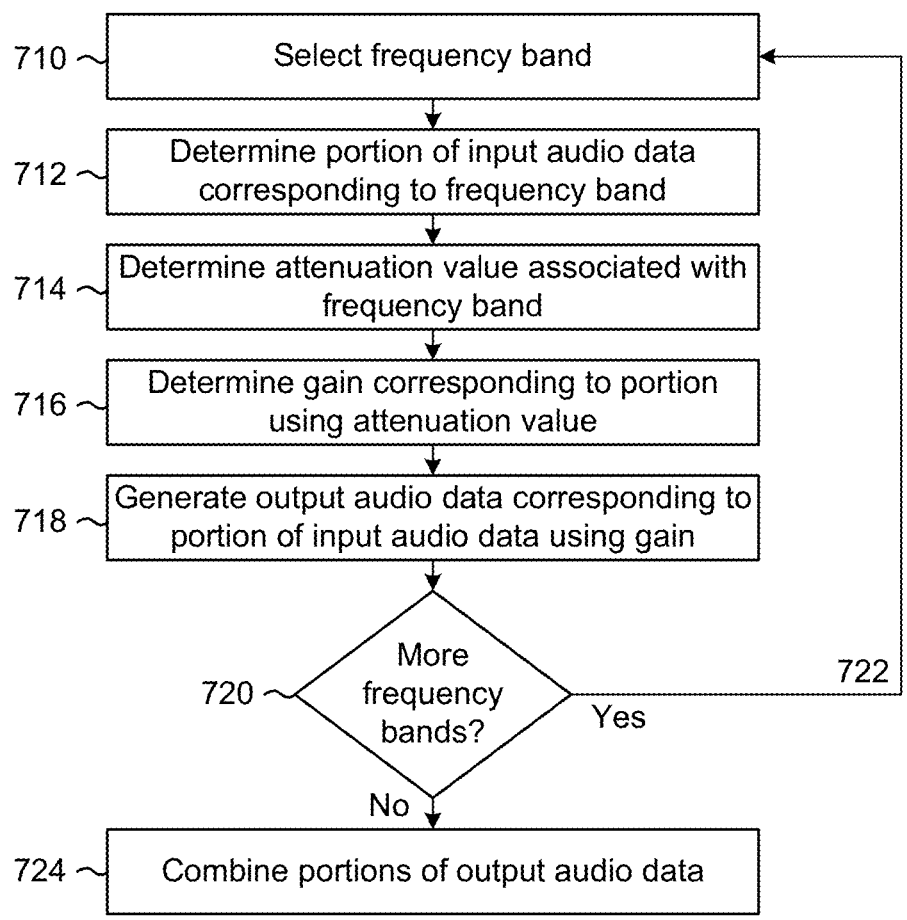
FIG. 7 is a flowchart conceptually illustrating an example method for performing residual echo suppression according to examples of the present disclosure.

As illustrated in FIG. 1, the RES 122 may apply (130) residual echo suppression using a low attenuation value $\alpha_1$ for low frequencies and a high attenuation value $\alpha_2$ for high frequencies. Residual echo suppression, which is discussed in greater detail below with regard to FIGS. 5-7, is performed by selectively attenuating, based on individual frequency bands, input audio data to generate output audio data. For example, the RES 122 may determine a gain for a portion of the input audio data corresponding to a specific frequency band (e.g., 100 Hz to 200 Hz) and may attenuate the portion of the input audio data based on the gain to generate a portion of the output audio data corresponding to the specific frequency band. Thus, a gain may be determined for each frequency band and therefore the amount of attenuation may vary based on the frequency band.

The device 110 may determine the gain based on the attenuation value. For example, a low attenuation value $\alpha_1$ (e.g., closer to a value of zero) results in a gain that is closer to a value of one and therefore an amount of attenuation is relatively low. Thus, the RES 122 acts similar to a pass-through filter for the low frequency bands. An energy level of the output audio data is therefore similar to an energy level of the input audio data. In contrast, a high attenuation value $\alpha_2$ (e.g., closer to a value of one) results in a gain that is closer to a value of zero and therefore an amount of attenuation is relatively high. Thus, the RES 122 attenuates the high frequency bands, such that an energy level of the output audio data is lower than an energy level of the input audio data. Therefore, the energy level of the output audio data corresponding to the high frequency bands is lower than the energy level of the output audio data corresponding to the low frequency bands.

The device 110 may determine (132) an average energy level of the output audio data corresponding to the low frequencies (e.g., low frequency bands), may determine (134) an average energy level of the output audio data corresponding to the high frequencies (e.g., high frequency bands), may determine (136) a difference between the two and may determine (138) if the difference is above a threshold value. If the difference is above the threshold value, the device 110 may use (140) the high attenuation value for the low frequencies and the high attenuation value for the high frequencies. If the difference is below the threshold value, the device 110 may use (142) the low attenuation value for the low frequencies and the high attenuation value for the high frequencies.

The device 110 may then apply (144) residual echo suppression to the error signal m(t) to generate the final output r(t).

Figure 4:
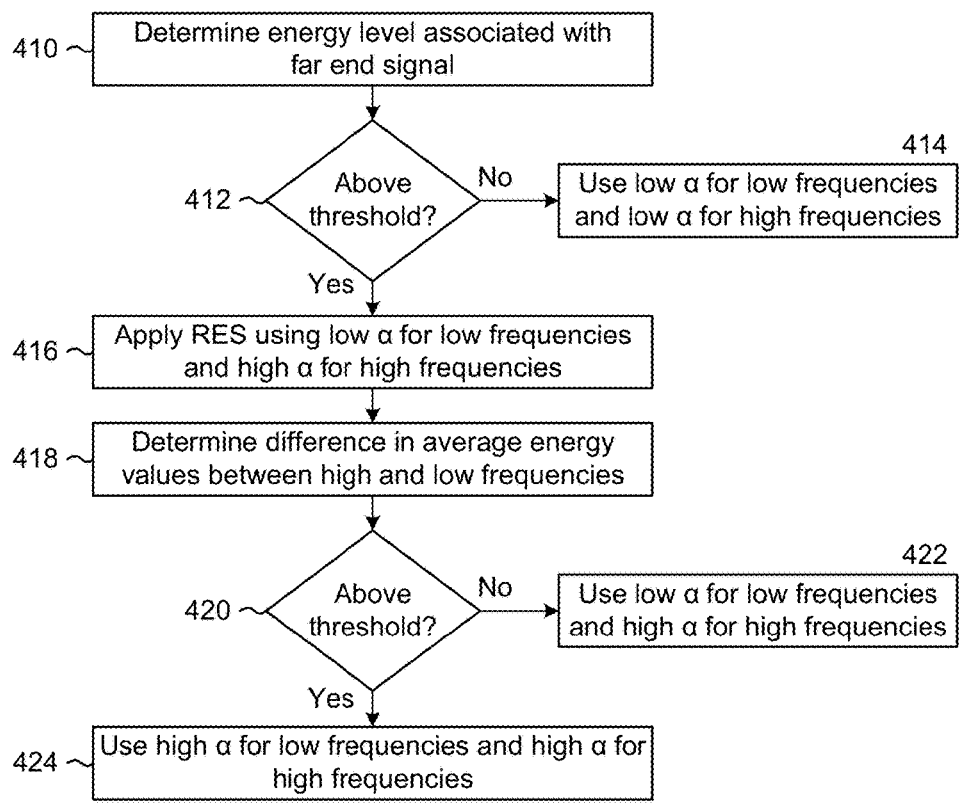
FIG. 4 is a flowchart conceptually illustrating an example method for selecting attenuation values based on system conditions according to examples of the present disclosure.

FIG. 4 is a flowchart conceptually illustrating an example method for selecting attenuation values based on system conditions according to examples of the present disclosure. As illustrated in FIG. 4, the device 110 may determine (410) an energy level associated with the far end signal and may determine (412) if the energy level is above a threshold value. If the energy level is below the threshold value, the device 110 may use (414) a low attenuation value $\alpha_1$ for low frequencies and the low attenuation value $\alpha_1$ for high frequencies (e.g., no talk and/or near end single talk). While step 414 illustrates the device 110 using the low attenuation value $\alpha_i$ for low frequencies and the low attenuation value $\alpha_i$ for high frequencies, the disclosure is not limited thereto and the device 110 may use any attenuation value without departing from the disclosure. As will be discussed in greater detail below, the device 110 uses the attenuation value to determine an amount of gain for the RES 122 to apply to the error signal m(t) to generate the final output r(t). For example, the attenuation value is multiplied by the energy level associated with the far end signal (e.g., a power spectral density of the echo estimate signal y'(k)). When the energy level associated with the far end signal is below the threshold value (e.g., the echo estimate signal y'(k) is relatively low), the attenuation value is multiplied by a small amount and therefore a value of the attenuation value does not change the gain determined by the RES 122.

If the energy level is above the threshold value, the device 110 may apply (416) residual echo suppression (RES) using the low attenuation value $\alpha_1$ for the low frequencies and a high attenuation value $\alpha_2$ for the high frequencies, may determine (418) a difference in average energy values between the low frequencies and the high frequencies and may determine (420) if the difference is above a second threshold value. If the difference is below the second threshold value, the device 110 may use (422) the low attenuation value $\alpha_1$ for the low frequencies and the high attenuation value $\alpha_2$ for the high frequencies (e.g., double talk). If the difference is above the second threshold value, the device 110 may use (424) the high attenuation value ($\alpha_2$) for the low frequencies and the high attenuation value ($\alpha_2$) for the high frequencies (e.g., far end single talk).

While FIG. 4 illustrates the RES 122 using the low attenuation value $\alpha_1$ and/or the high attenuation value $\alpha_2$ in step 416 (e.g., during an analysis step) and in steps 414/422/424 (e.g., to generate the final output r(t)), the disclosure is not limited thereto. In some examples, the RES 122 may use a first low attenuation value $\alpha_{1a}$ and a first high attenuation value $\alpha_{2a}$ in step 416 and may use a second low attenuation value $\alpha_{1a}$ and a second high attenuation value $\alpha_{2b}$ in steps 414/422/424. For example, the first low attenuation value $\alpha_{1a}$ and a first high attenuation value $\alpha_{2a}$ may be further apart in order to increase the difference in average energy values, whereas the second low attenuation value $\alpha_n$ and the second high attenuation value $\alpha_{2b}$ may be closer together in order to improve a quality of and/or avoid distortion in the final output r(t).

FIG. 5 is a flowchart conceptually illustrating an example method for detecting double talk according to examples of the present disclosure. As illustrated in FIG. 5, the device 110 may receive (510) input audio data, such as an output from the acoustic echo canceller 120. The device 110 may determine (512) first gain(s) for low frequency bands using a first attenuation value $\alpha_1$, may generate (514) first attenuated audio data using the first gain(s) and may determine (516) a first energy level corresponding to the first attenuated audio data. In some examples, the low frequency bands may correspond to a plurality of frequency bands and the device 110 may determine an individual gain for each frequency band of the plurality of frequency bands. However, the disclosure is not limited thereto and the size of the frequency bands may vary without departing from the disclosure. For example, the low frequency bands may correspond to a single frequency band without departing from the disclosure.

The device 110 may determine the first gain(s) using the following equation:

$$H(k) = \frac{S_{ed}(k)}{S_{ed}(k) + \alpha S_{yy}(k)} \quad \text{Equation (1)}$$

where k is a selected frequency band, H(k) is the subband gain for the selected frequency band k, $S_{ed}(k)$ is the cross power spectral density of the error signal m(t) and the microphone signal z(t), $S_{yy}(k)$ is the power spectral density of the echo estimate signal y'(k) and a is the attenuation factor. A power spectral density (e.g., power spectral density function) describes the distribution of power into frequency components composing a signal. For example, the power spectral density $S_{yy}(k)$ of the echo estimate signal y'(k) describes the distribution of power of the echo estimate signal y'(k) into frequency components within the selected frequency band k. The device 110 may determine the power spectral density using techniques known to one of skill in the art without departing from the disclosure.

To determine the cross power spectral density (e.g., cross power spectral density function) of the error signal m(t) and the microphone signal z(t), the device 110 may determine a first power spectral density of the error signal m(t) and a second power spectral density of the microphone signal z(t) and may calculate the cross power spectral density of the first power spectral density and the second power spectral density using techniques known to one of skill in the art. A cross power spectral density (e.g., cross-spectral density) is a coherence or cross-correlation between two signals. For example, the cross power spectral density of the error signal m(t) and the microphone signal z(t) determines the amount of correlation between the input (e.g., microphone signal z(t)) and the output (e.g., error signal m(t)) of the AEC 120. A higher correlation indicates the presence of double talk, as the output of the AEC 120 is similar to the input of the AEC 120, indicating that only a small portion of the microphone signal z(t) corresponds to the echo signal y(t) is therefore removed (e.g., power spectral density $S_{yy}(k)$ of the echo estimate signal y'(k) is relatively small). Similarly, a lower correlation indicates the presence of far end single talk, as the output of the AEC 120 is not similar to the input of the AEC 120, indicating that a large portion of the microphone signal z(t) corresponds to the echo signal y(t) and is therefore removed (e.g., power spectral density $S_{yy}(k)$ of the echo estimate signal y'(k) is relatively large). When the power spectral density $S_{yy}(k)$ of the echo estimate signal y'(k) is relatively low, the denominator of Equation 1 is roughly equal to the cross power spectral density $S_{ed}(k)$ of the error signal m(t), resulting in the subband gain H(k) being close to a value of one. In contrast, when the power spectral density $S_{yy}(k)$ of the echo estimate signal y'(k) is relatively high, the denominator of Equation 1 is larger than the cross power spectral density $S_{ed}(k)$ of the error signal m(t), resulting in the subband gain H(k) decreasing and in some examples being close to a value of zero.

To illustrate an example of generating the first attenuated audio data, the device 110 may determine a first gain for a first frequency band, determine a first portion of the input audio data corresponding to the first frequency band and generate a first portion of the first attenuated audio data corresponding to the first frequency band by attenuating the first portion of the input audio data based on the first gain. Similarly, the device 110 may determine a second gain for a second frequency band, determine a second portion of the input audio data corresponding to the second frequency band and generate a second portion of the first attenuated audio data corresponding to the second frequency band by attenuating the second portion of the input audio data based on the second gain.

As the first attenuation value $\alpha_1$ is relatively low, the power spectral density of the echo estimate signal y'(k) is given less weight such that the first gain(s) (e.g., subband gains H(k)) are closer to a value of one and therefore an amount of attenuation is relatively low. Thus, the RES 122 acts similar to a pass-through filter for the low frequency bands. The first energy level is therefore similar to an energy level of the input audio data. In some examples, the device 110 may determine the first energy level by averaging energy levels for each of the low frequency bands, although the disclosure is not limited thereto.

The device 110 may determine (518) second gain(s) for high frequency bands using a second attenuation value $\alpha_2$, may generate (520) second attenuated audio data using the second gain(s) and may determine (522) a second energy level corresponding to the second attenuated audio data. In some examples, the high frequency bands may correspond to a plurality of frequency bands and the device 110 may determine an individual gain for each frequency band of the plurality of frequency bands. However, the disclosure is not limited thereto and the size of the frequency bands may vary without departing from the disclosure. For example, the high frequency bands may correspond to a single frequency band without departing from the disclosure.

The device 110 may determine the second gain(s) using Equation 1, as described in greater detail above. As the second attenuation value $\alpha_2$ is relatively high (e.g., higher than the first attenuation value $\alpha_1$), the power spectral density of the echo estimate signal y'(k) is given greater weight and the second gain(s) (e.g., subband gains H(k) for high frequency bands) are lower (e.g., closer to a value of zero) and therefore an amount of attenuation is relatively high. Thus, the RES 122 attenuates the high frequency bands. The second energy level is therefore lower than an energy level of the input audio data. In some examples, the device 110 may determine the second energy level by averaging energy levels for each of the high frequency bands, although the disclosure is not limited thereto.

The device 110 may determine (524) a difference in energy levels between the first energy level and the second energy level and may determine (526) if the difference is above a threshold value. If the difference is above the threshold value, the device 110 may use (528) the second attenuation value $\alpha_2$ for the low frequencies and the second attenuation value $\alpha_2$ for the high frequencies (e.g., far end single talk). If the difference is below the threshold value, the device 110 may use (530) the first attenuation value $\alpha_1$ for the low frequencies and the second attenuation value $\alpha_2$ for the high frequencies (e.g., double talk). While not illustrated in FIG. 5, if the far end signal x(t) is not active (e.g., below a threshold value) while the difference is above the threshold value, the device 110 may use the first attenuation value $\alpha_1$ for the low frequencies and the first attenuation value $\alpha_1$ for the high frequencies (e.g., near end single talk).

The device 110 may then apply (532) residual echo suppression to generate output audio data. For example, the device 110 may apply the selected attenuation values a to Equation 1 to determine individual gains for each frequency band and may attenuate each frequency band of the input audio data based on the individual gains to generate the output audio data.

FIG. 6 is a flowchart conceptually illustrating an example method for performing residual echo suppression according to examples of the present disclosure. As illustrated in FIG. 6, the device 110 may select (610) a frequency band, determine (612) that the selected frequency band is included in the low frequency bands, determine (614) a portion of the input audio data corresponding to the selected frequency band, determine (616) a first gain corresponding to the portion of the input audio data using the first attenuation value $\alpha_1$ and generate (618) a portion of output audio data corresponding to the portion of the input audio data using the first gain. The device 110 may determine (620) if there are more low frequency bands and if so, may loop to step 610 to select an additional frequency band.

If there are no more low frequency bands, the device 110 may select (622) a frequency band, determine (624) that the selected frequency band is included in the high frequency bands, determine (626) a portion of the input audio data corresponding to the selected frequency band, determine (628) a second gain corresponding to the portion of the input audio data using the second attenuation value as and generate (630) a portion of the output audio data corresponding to the portion of the input audio data using the second gain. The device 110 may determine (632) if there are more high frequency bands and if so, may loop to step 622 to select an additional frequency band.

If there are no more high frequency bands, the device 110 may combine (634) each of the portions of output audio data generated in steps 618 and 630 to generate the output audio data.

FIG. 7 is a flowchart conceptually illustrating an example method for performing residual echo suppression according to examples of the present disclosure. As illustrated in FIG. 7, the device 110 may select (710) a frequency band, determine (712) a portion of the input audio data corresponding to the selected frequency band, determine (714) an attenuation value associated with the frequency band, determine (716) a gain corresponding to the portion of the input audio data using the attenuation value $\alpha$ (e.g., using Equation 1, described in greater detail above) and generate (718) a portion of output audio data corresponding to the portion of the input audio data using the gain. The device 110 may determine (720) if there are more low frequency bands and if so, may loop (722) to step 710 to select an additional frequency band. If there are no more frequency bands, the device 110 may combine (724) each of the portions of output audio data generated in step 718 to generate the output audio data.

FIG. 8 is a block diagram conceptually illustrating example components of a system for voice enhancement according to embodiments of the present disclosure. In operation, the system 100 may include computer-readable and computer-executable instructions that reside on the device 110, as will be discussed further below.

As illustrated in FIG. 8, the device 110 may include an address/data bus 802 for conveying data among components of the device 110. Each component within the device 110 may also be directly connected to other components in addition to (or instead of) being connected to other components across the bus 802.

The device 110 may include one or more controllers/processors 804, which may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 110 may also include a data storage component 808, for storing data and controller/processor-executable instructions (e.g., instructions to perform the algorithm illustrated in FIGS. 1, 4, 5, 6 and/or 7). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 810.

The device 110 includes input/output device interfaces 810. A variety of components may be connected through the input/output device interfaces 810. For example, the device 110 may include one or more microphone(s) 112 and/or one or more speaker(s) 114 that connect through the input/output device interfaces 810, although the disclosure is not limited thereto. Instead, the number of microphone(s) 112 and/or speaker(s) 114 may vary without departing from the disclosure. In some examples, the microphone(s) 112 and/or speaker(s) 114 may be external to the device 110.

The input/output device interfaces 810 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 810 may also include an interface for an external peripheral device connection such as universal serial bus (USB), FireWire, Thunderbolt, Ethernet port or other connection protocol that may connect to network(s) 10. The input/output device interfaces 810 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 may include an acoustic echo canceller (AEC) 120 and a residual echo suppressor (RES) 122, as discussed in greater detail above. These components may comprise processor-executable instructions stored in storage 808 to be executed by controller(s)/processor(s) 804 (e.g., software, firmware, hardware, or some combination thereof). For example, components of the AEC 120 and/or the RES 122 may be part of a software application running in the foreground and/or background on the device 110. Some or all of the controllers/components of the AEC 120 and/or the RES 122 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 804, using the memory 806 as temporary "working" storage at runtime. The executable instructions may be stored in a non-transitory manner in non-volatile memory 806, storage 808, or an external device. Alternatively, some or all of the executable instructions may be embedded in hardware or firmware in addition to or instead of software.

The components of the device 110, as illustrated in FIG. 8, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising, by a device configured to send and receive audio data:
 receiving playback audio data from a remote device;
 generating, based on the playback audio data, playback audio;

generating microphone audio data corresponding to the playback audio;

determining echo estimate data corresponding to the playback audio data;

generating first audio data by removing at least a portion of the echo estimate data from the microphone audio data;

determining, using a first attenuation value, a first gain corresponding to a low frequency portion of the first audio data;

attenuating, based on the first gain, an amplitude of the low frequency portion of the first audio data to generate first attenuated audio data;

determining a first energy level associated with the first attenuated audio data;

determining, using a second attenuation value, a second gain corresponding to a high frequency portion of the first audio data;

attenuating, based on the second gain, an amplitude of a second portion of the first audio data to generate second attenuated audio data;

determining a second energy level associated with the second attenuated audio data;

determining that double-talk conditions are detected by determining that a difference between the first energy level and the second energy level is below a threshold value; and generating, in response to determining that the double-talk conditions are detected, output audio data using the first attenuation value for low frequency bands of the first audio data and the second attenuation value for high frequency bands of the first audio data.

2. The computer-implemented method of claim 1, wherein generating the output audio data further comprises:

selecting a first frequency band, the first frequency band being one of the low frequency bands;

determining a first portion of the first audio data corresponding to the first frequency band;

determining, using the first attenuation value, a third gain corresponding to the first portion of the first audio data; and attenuating, based on the third gain, an amplitude of the first portion of the first audio data to generate a portion of the output audio data corresponding to the first frequency band.

3. The computer-implemented method of claim 2, wherein determining the third gain further comprises:

determining a first power spectral density function corresponding to a portion of the echo estimate data associated with the first frequency band;

determining a second power spectral density function corresponding to the first portion of the first audio data;

determining a third power spectral density function corresponding to a portion of the microphone audio data associated with the first frequency band;

determining a cross power spectral density function of the second power spectral density function and the third power spectral density function;

multiplying the first attenuation value by the first power spectral density function to generate a product; and determining the third gain by dividing the cross power spectral density function by a sum of the cross power spectral density function and the product.

4. The computer-implemented method of claim 1, further comprising:

receiving second audio data;

determining, using the first attenuation value, a third gain corresponding to a low frequency portion of the second audio data;

attenuating, based on the third gain, an amplitude of the low frequency portion of the second audio data to generate third audio data;

determining, using the second attenuation value, a fourth gain corresponding to a high frequency portion of the second audio data;

attenuating, based on the fourth gain, an amplitude of the high frequency portion of the second audio data to generate fourth audio data;

determining a third energy level associated with the third audio data;

determining a fourth energy level associated with the fourth audio data;

determining that a second difference between the third energy level and the fourth energy level is above the threshold value; and generating second output audio data using the second attenuation value for the low frequency bands of the second audio data and the second attenuation value for the high frequency bands of the second audio data.

5. A computer-implemented method, comprising, by a device:

receiving first audio data originating at the device;

determining, using a first attenuation value, a first gain corresponding to a low frequency portion of the first audio data;

attenuating, based on the first gain, the low frequency portion of the first audio data to generate first attenuated audio data;

determining a first energy level associated with the first attenuated audio data;

determining, using a second attenuation value, a second gain corresponding to a high frequency portion of the first audio data;

attenuating, based on the second gain, a second portion of the first audio data to generate second attenuated audio data;

determining a second energy level associated with the second attenuated audio data;

determining that double-talk conditions are detected by determining that a difference between the first energy level and the second energy level is below a threshold value; and generating, in response to determining that the double-talk conditions are detected, output audio data using the first attenuation value for low frequency bands of the first audio data and the second attenuation value for high frequency bands of the first audio data.

6. The computer-implemented method of claim 5, wherein generating the output audio data further comprises:

selecting a first frequency band, the first frequency band being one of the low frequency bands;

determining a first portion of the first audio data corresponding to the first frequency band;

determining, using the first attenuation value, a third gain corresponding to the first portion of the first audio data; and attenuating, based on the third gain, the first portion of the first audio data to generate a portion of the output audio data corresponding to the first frequency band.

7. The computer-implemented method of claim 6, wherein determining the third gain further comprises:
- determining a first power spectral density function corresponding to a portion of an echo estimate signal associated with the first frequency band;
- determining a second power spectral density function corresponding to the first portion of the first audio data;
- determining a third power spectral density function corresponding to a portion of a microphone signal associated with the first frequency band;
- determining a cross power spectral density function of the second power spectral density function and the third power spectral density function;
- multiplying the first attenuation value by the first power spectral density function to generate a product; and
- determining the third gain by dividing the cross power spectral density function by a sum of the cross power spectral density function and the product.

8. The computer-implemented method of claim 6, wherein generating the output audio data further comprises:
- selecting a second frequency band, the second frequency band being one of the high frequency bands;
- determining the second portion of the first audio data corresponding to the second frequency band;
- determining, using the second attenuation value, a fourth gain corresponding to the second portion of the first audio data;
- attenuating, based on the fourth gain, the second portion of the first audio data to generate a portion of the output audio data corresponding to the second frequency band.

9. The computer-implemented method of claim 5, further comprising:
- determining that an average power value corresponding to playback audio data is below an energy threshold value, the playback audio data received from a remote device;
- generating the output audio data using the first attenuation value for the low frequency bands of the first audio data and the first attenuation value for the high frequency bands of the first audio data.

10. The computer-implemented method of claim 5, further comprising:
- receiving second audio data;
- determining, using the first attenuation value, a third gain corresponding to a low frequency portion of the second audio data;
- attenuating, based on the third gain, the low frequency portion of the second audio data to generate third audio data;
- determining, using the second attenuation value, a fourth gain corresponding to a high frequency portion of the second audio data;
- attenuating, based on the fourth gain, the high frequency portion of the second audio data to generate fourth audio data;
- determining a third energy level associated with the third audio data;
- determining a fourth energy level associated with the fourth audio data;
- determining that the double-talk conditions are not detected by determining that a second difference between the third energy level and the fourth energy level is above the threshold value; and
- generating, in response to determining that the double-talk conditions are not detected, second output audio data using the second attenuation value for the low frequency bands of the second audio data and the second attenuation value for the high frequency bands of the second audio data.

11. The computer-implemented method of claim 10, wherein generating the second output audio data further comprises:
- selecting a first frequency band, the first frequency band one of the low frequency bands;
- determining a first portion of the second audio data corresponding to the first frequency band;
- determining, using the second attenuation value, a fifth gain corresponding to the first portion of the input audio data; and
- attenuating, based on the fifth gain, the first portion of the second audio data to generate a portion of the second output audio data corresponding to the first frequency band.

12. The computer-implemented method of claim 5, further comprising:
- receiving playback audio data from a remote device;
- generating, based on the playback audio data, playback audio using at least one speaker;
- generating microphone audio data using at least one microphone, the microphone audio data corresponding to the playback audio;
- determining echo estimate data corresponding to the playback audio data; and
- performing, based on the echo estimate data, acoustic echo cancellation on the microphone audio data, the acoustic echo cancellation removing at least a portion of the echo estimate data from the microphone audio data to generate the first audio data.

13. A device comprising:
- at least one processor; and
- memory including instructions operable to be executed by the at least one processor to cause the device to:
  - receive first audio data originating at the device;
  - determine, using a first attenuation value, a first gain corresponding to a low frequency portion of the first audio data;
  - attenuate, based on the first gain, the low frequency portion of the first audio data to generate first attenuated audio data;
  - determine a first energy level associated with the first attenuated audio data;
  - determine, using a second attenuation value, a second gain corresponding to a high frequency portion of the first audio data;
  - attenuate, based on the second gain, a second portion of the first audio data to generate second attenuated audio data;
  - determine a second energy level associated with the second attenuated audio data;
  - determine that double-talk conditions are detected by determining that a difference between the first energy level and the second energy level is below a threshold value; and
  - generate, in response to the difference being below the threshold value, output audio data using the first attenuation value for low frequency bands of the first audio data and the second attenuation value for high frequency bands of the first audio data.

14. The device of claim 13, wherein the memory further comprises instructions that, when executed by the at least one processor, further cause the device to:
- select a first frequency band, the first frequency band being one of the low frequency bands;

determine a first portion of the first audio data corresponding to the first frequency band;
determine, using the first attenuation value, a third gain corresponding to the first portion of the first audio data; and
attenuate, based on the third gain, the first portion of the first audio data to generate a portion of the output audio data corresponding to the first frequency band.

15. The device of claim 14, wherein the memory further comprises instructions that, when executed by the at least one processor, further cause the device to:
determine a first power spectral density function corresponding to a portion of an echo estimate signal associated with the first frequency band;
determine a second power spectral density function corresponding to the first portion of the first audio data;
determine a third power spectral density function corresponding to a portion of a microphone signal associated with the first frequency band;
determine a cross power spectral density function of the second power spectral density function and the third power spectral density function;
multiply the first attenuation value by the first power spectral density function to generate a product; and
determine the third gain by dividing the cross power spectral density function by a sum of the cross power spectral density function and the product.

16. The device of claim 14, wherein the memory further comprises instructions that, when executed by the at least one processor, further cause the device to:
select a second frequency band, the second frequency band being one of the high frequency bands;
determine the second portion of the first audio data corresponding to the second frequency band;
determine, using the second attenuation value, a fourth gain corresponding to the second portion of the first audio data;
attenuate, based on the fourth gain, the second portion of the first audio data to generate a portion of the output audio data corresponding to the second frequency band.

17. The device of claim 13, wherein the memory further comprises instructions that, when executed by the at least one processor, further cause the device to:
determine that an average power value corresponding to playback audio data is below an energy threshold value, the playback audio data received from a remote device;
generate the output audio data using the first attenuation value for the low frequency bands of the first audio data and the first attenuation value for the high frequency bands of the first audio data.

18. The device of claim 13, wherein the memory further comprises instructions that, when executed by the at least one processor, further cause the device to:
receive second audio data;
determine, using the first attenuation value, a third gain corresponding to a low frequency portion of the second audio data;
attenuate, based on the third gain, the low frequency portion of the second audio data to generate third audio data;
determine, using the second attenuation value, a fourth gain corresponding to a high frequency portion of the second audio data;
attenuate, based on the fourth gain, the high frequency portion of the second audio data to generate fourth audio data;
determine a third energy level associated with the third audio data;
determine a fourth energy level associated with the fourth audio data;
determine that the double-talk conditions are not detected by determining that a second difference between the third energy level and the fourth energy level is above the threshold value; and
generate, in response to determining that the double-talk conditions are not detected, second output audio data using the second attenuation value for the low frequency bands of the second audio data and the second attenuation value for the high frequency bands of the second audio data.

19. The device of claim 18, wherein the memory further comprises instructions that, when executed by the at least one processor, further cause the device to:
select a first frequency band, the first frequency band one of the low frequency bands;
determine a first portion of the second audio data corresponding to the first frequency band;
determine, using the second attenuation value, a fifth gain corresponding to the first portion of the input audio data; and
attenuate, based on the fifth gain, the first portion of the second audio data to generate a portion of the second output audio data corresponding to the first frequency band.

20. The device of claim 13, wherein the memory further comprises instructions that, when executed by the at least one processor, further cause the device to:
receive playback audio data from a remote device;
generate, based on the playback audio data, playback audio using at least one speaker;
generate microphone audio data using at least one microphone, the microphone audio data corresponding to the playback audio;
determine echo estimate data corresponding to the playback audio data; and
perform, based on the echo estimate data, acoustic echo cancellation on the microphone audio data, the acoustic echo cancellation removing at least a portion of the echo estimate data from the microphone audio data to generate the first audio data.

21. The computer-implemented method of claim 5, wherein:
determining that the double-talk conditions are detected further comprises determining, during a first period of time, that the difference is below the threshold value indicating that the double-talk conditions are detected in the first audio data; and
generating the output audio data further comprises generating, during a second period of time after the first period of time, in response to determining that the double-talk conditions are detected, the output audio data using the first attenuation value for the low frequency bands of the first audio data and the second attenuation value for the high frequency bands of the first audio data.

22. The computer-implemented method of claim 5, wherein determining that the double-talk conditions are detected occurs during a first period of time, and generating the output audio data further comprises:
generating, during a second period of time after the first period of time, in response to determining that the double-talk conditions are detected, a first portion of the output audio data based on the first attenuation value, the first portion of the output audio data corresponding to the low frequency bands of the first audio data; and generating, during the second period of time, in response to determining that the double-talk conditions are detected, a second portion of the output audio data based on the second attenuation value, the second portion of the output audio data corresponding to the high frequency bands of the first audio data.

23. A computer-implemented method, comprising, by a device:

receiving first audio data originating at the device;

determining, using a first attenuation value, a first gain corresponding to a low frequency portion of the first audio data;

attenuating, based on the first gain, the low frequency portion of the first audio data to generate first attenuated audio data;

determining a first energy level associated with the first attenuated audio data;

determining, using a second attenuation value, a second gain corresponding to a high frequency portion of the first audio data;

attenuating, based on the second gain, a second portion of the first audio data to generate second attenuated audio data;

determining a second energy level associated with the second attenuated audio data;

determining that double-talk conditions are not detected by determining that a difference between the first energy level and the second energy level is above a threshold value; and generating, in response to determining that the double-talk conditions are not detected, output audio data using the second attenuation value for low frequency bands of the first audio data and for high frequency bands of the first audio data.

* * * * *